United States Patent [19]
Fukumoto et al.

[11] Patent Number: 5,591,794
[45] Date of Patent: Jan. 7, 1997

[54] RUBBER COMPOSITION FOR TIRE TREAD

[75] Inventors: Takahiro Fukumoto; Yoko Nakada, both of Kobe; Yoichi Mizuno, Akashi, all of Japan

[73] Assignee: Sumitomo Rubber Industries, Ltd., Hyogo, Japan

[21] Appl. No.: 421,606

[22] Filed: Apr. 13, 1995

[30] Foreign Application Priority Data

Apr. 19, 1994 [JP] Japan ................................. 6-080751

[51] Int. Cl.$^6$ ........................................... C08K 3/34
[52] U.S. Cl. ........................................ 524/447; 524/445
[58] Field of Search ..................... 524/447, 445

[56] References Cited

U.S. PATENT DOCUMENTS

| | | | |
|---|---|---|---|
| 4,352,704 | 10/1982 | Williams et al. | 156/125 |
| 4,522,970 | 6/1985 | Scriver | 524/447 |
| 4,598,105 | 7/1986 | Weber et al. | 523/215 |
| 4,714,733 | 12/1987 | Itoh et al. | 524/403 |
| 4,897,446 | 1/1990 | Aonuma | 525/64 |
| 5,382,635 | 1/1995 | McInnis et al. | 525/356 |

FOREIGN PATENT DOCUMENTS 0361667   4/1990   European Pat. Off. .

*Primary Examiner*—Edward J. Cain
*Attorney, Agent, or Firm*—Birch, Stewart, Kolasch & Birch, LLP

[57] ABSTRACT

A tread rubber composition is provided which includes 100 parts by weight of a diene rubber containing as a main component thereof at least one rubber selected from the group consisting of natural rubber, polyisoprene and polybutadiene, and 30 to 90 parts by weight of a vulcanized rubber powder, wherein the vulcanized rubber powder is a powder of a rubber resulting from the vulcanization of a rubber composition including 100 parts by weight of a diene rubber containing as a main component thereof at least one rubber selected from the group consisting of natural rubber, polyisoprene and polybutadiene, and 30 to 100 parts by weight of a clay mainly composed of kaolinite. The rubber composition for tire tread assures improved braking performance with the fracture resistance thereof kept satisfactory and, hence, a tire tread made of such rubber composition makes it possible to build a studless tire exhibiting an improved gripping force.

19 Claims, No Drawings

RUBBER COMPOSITION FOR TIRE TREAD

BACKGROUND OF THE INVENTION

1. Field of the Invention

The present invention relates to a rubber composition for a tire tread to be used for improving the gripping force of a studless tire, to a tire tread formed from such a rubber composition, and to a tire having such a tire tread.

2. Description of the Related Art

Predominant factors responsible for friction between a tread rubber and a road surface includes (1) hysteresis loss friction, (2) adhesion friction and (3) dig-out friction. When on a road surface having an extremely low friction coefficient such as a frozen road surface, the hysteresis loss friction (1) is extremely low, and friction due to items (2), (3) are predominant.

Although a spike tire can provide an excellent gripping force on a frozen road surface since it produces a large dig-out friction force, there has recently been a tendency to inhibit the use of spike tires so as to prevent pollution caused by powdery dust. Thus, studless tires with no spikes have rapidly prevailed.

Since the dig-out frictional force depends on the tread pattern or surface form of the tread, the studless tire has also been devised to improve the dig-out frictional force thereof, for example, by incorporating therein foamed rubber or organic fiber, thereby increasing unevenness on the tread surface. However, the dig-out frictional force of even a studless tire thus devised is low as compared with the spike tire and, hence, the gripping force thereof is inferior to that of the spike tire. Particularly when a frozen road surface is ground smooth by idle rotation of the tire upon the starting of a vehicle, the gripping force of the studless tire is degraded.

When on a road surface having an extremely low friction coefficient, such as a frozen road surface, the adhesion friction as well as the dig-out friction contributes to an improvement in the gripping force. It is important in this instance to increase the area of contact between the road surface and the tire by eliminating hydroplaning formed due to friction by thawing of the frozen road surface, in order to improve the adhesion friction. The unevenness on the tread surface not only improves the dig-out frictional force but also has the effect of eliminating hydroplaning to increase the adhesion friction. Further, the characteristics of the rubber itself give an effect on the adhesion frictional force. For instance, the adhesion frictional force can be increased by making the rubber material soft thereby increasing the area of contact with a road surface.

Although various proposals have been made to improve the gripping force of a studless tire by increasing the adhesional frictional force, none of them has been satisfactory and further improvements have been demanded.

The present invention has been achieved in view of the foregoing technical background and an object thereof is to provide a rubber composition for tire tread which provides for a studless tire with an improved gripping force.

The present inventors have made various studies for increasing the adhesion frictional force of a tire on a frozen road surface and, as a result, have developed the present invention by determining that the frictional force can be increased by adding a calcined clay, e.g. amorphous metakaolin resulting from calcination at a high temperature of about 600° C.

SUMMARY OF THE INVENTION

Thus, according to the present invention there is provided a rubber composition for tire tread comprising 100 parts by weight of a diene rubber containing as a main component thereof at least one rubber selected from the group consisting of natural rubber, polyisoprene and polybutadiene, and 30 to 90 parts by weight of a vulcanized rubber powder, wherein the vulcanized rubber powder is a powder of a rubber resulting from vulcanization of a rubber composition including 100 parts by weight of a diene rubber containing as a main component thereof at least one rubber selected from the group consisting of natural rubber, polyisoprene and polybutadiene and 30 to 100 parts by weight of a clay mainly composed of kaolinite.

DETAILED DESCRIPTION OF THE PREFERRED EMBODIMENTS

The present invention will now be described in detail.

At first, explanation is to be made on the rubber composition constituting the vulcanized rubber powder (hereinafter referred to as "rubber composition for powder") used in the tread rubber composition according to the present invention.

The rubber component of the rubber composition for powder includes at least one of natural rubber, polyisoprene rubber and polybutadiene rubber, but may be incorporated with other diene rubber ingredients such as SBR as required.

The clay blended with the rubber composition for powder is a clay mainly composed of kaolinite, for which amorphous metakaolin calcined at a high temperature of about 600° C. is preferably used.

The blending amount of the clay in the rubber composition for powder is from 30 to 100 parts by weight, preferably, 40 to 70 parts by weight relative to 100 parts by weight of the rubber component of the rubber composition for powder. If it is less than 30 parts by weight, the effect of increasing the frictional force on a frozen road surface is scarcely observed and, if it exceeds 100 parts by weight, the hardness of the vulcanized rubber powder is increased excessively, resulting in a tendency to reduce the frictional force and fracture resistance of the tread rubber.

The clay (generally of about 1.0 μm in grain size) blended in the rubber composition for powder has a large grain size and poor reinforcing property as compared with a fine particulate reinforcing material such as carbon black or silica (generally of about 10 to 40 μm in grain size). Accordingly, it is preferred to blend a reinforcing material such as carbon black or silica in the rubber composition for powder for providing a reinforcing effect. Among reinforcing agents, it is preferred to blend a silane coupling agent represented by $X_3SiR$ in which X represents an alkoxy group or chlorine atom and R represents a glycidoxy, methacryl, amino, mercapto, epoxy or imide group, or $(C_nH_{2n+1}O)_3-Si-(CH_2)_m-S_k-(CH_2)_m-Si-(C_nH_{2n+1}O)_3$ in which n is an integer from 1 to 4, and m and k are each an integer from 1 to 6 in an amount from 1 to 8 parts by weight, preferably, 2 to 5 parts by weight relative to 100 parts by weight of the rubber component of the rubber composition for powder. If the blending amount of the silane coupling agent is less than 1 part by weight, the reinforcing effect is scarcely provided, whereas if it exceeds 8 parts by weight, unreacted silane coupling agent is deposited on the surface of the vulcanized rubber powder to rather deteriorate the frictional force undesirably.

Usual additives for rubber blending such as a vulcanizer, a vulcanization accelerator and, if required, an antioxidant may be blended to the rubber composition for powder.

The rubber composition for powder of such a composition is vulcanized to prepare a clay-incorporated vulcanized rubber which is then powdered to obtain a vulcanized rubber powder. As the powdering method, any method presently known so far can be used, including, for example, a freezing pulverization method.

The grain size of the vulcanized rubber powder is preferably of complete 20 mesh pass and, particularly, of complete 60 mesh pass. If it is greater than the size of complete 20 mesh pass, the resulting fracture resistance is deteriorated.

The following is the tread rubber composition according to the present invention.

The rubber component used for the tread rubber composition of the present invention (hereinafter referred to as "matrix rubber component") is a diene rubber comprising at least one of natural rubber, polyisoprene and polybutadiene as the main ingredient, which has a low glass transition temperature and is less curable, even at a low temperature. The matrix rubber component comprises at least one of natural rubber, polyisoprene and polybutadiene, but other diene rubbers such as SBR may be mixed, as required.

The blending amount of the vulcanized rubber powder in the tread rubber composition is from 30 to 90 parts by weight, preferably, 40 to 70 parts by weight relative to 100 parts by weight of the matrix rubber component. If the blending amount of the vulcanized rubber powder is less than 30 parts by weight, the effect of increasing the frictional force on a frozen road surface is scarcely provided and, if it exceeds 90 parts by weight, the reinforcing property is deteriorated, and the wear resistance, cutting characteristic and the like are undesirably lowered.

Further, it is preferred that the vulcanized rubber powder is blended such that the blending amount of the clay in the tread rubber composition is from 10 to 40 parts by weight relative to 100 parts by weight of the rubber component of the tread rubber composition (corresponding to the total amount of the matrix rubber component and the rubber component of the vulcanized rubber powder). If it is less than 10 parts by weight, the effect of increasing the frictional force on the frozen road surface is scarcely observed and, if it exceeds 40 parts by weight, the hardness is increased excessively, thus tending to deteriorate the frictional force and the fracture resistance of the tread rubber.

The vulcanized rubber powder may be added after blending other blending ingredients than the rubber powder and homogeneously kneading them, or may be blended together with other blending ingredients and then kneaded homogeneously.

Blending of a specific clay having the effect of increasing the frictional force, to form the vulcanized rubber powder to be used in the tread rubber composition, is advantageous in suppressing the reduction of the gripping force on a dried road surface and the deterioration of the fracture resistance of the tread rubber composition as compared with the case of directly blending the clay to the matrix rubber composition. Also, the amount of the clay to be blended can be readily varied with the performance required.

EXAMPLES

The present invention will be more specifically described with reference to the following examples. It is to be noted that these examples are only illustrative of the present invention and not limitative thereof.

Preparation of Vulcanized Rubber Composition

Rubber compositions for powder of the formulations shown in Table 1 were prepared. As the clay, ICECAP K (trade name) manufactured by Shiraishi Calcium Co., Ltd. was used. As the silane coupling agent, KBE1003 (trade name) manufactured by Shin-Etsu Chemical Co., Ltd. was used. This coupling agent is vinyl triethoxysilane. As the vulcanization accelerator, NOXCELER-NS (trade name) manufactured by Ohuchi Shinko Kagaku Co., Ltd. was used. This is N-tert-butyl-2-benzothiazyl sulfene amide.

Each of the rubber compositions thus prepared was kneaded for about 3 to about 10 min by using, for example, a kneader or Banbury mixer and then vulcanized at about 140 to about 180° C. for about 10 to about 40 min, followed by being pulverized under freezing at about −230 to about −180° C. Thus vulcanized rubber powders A to J were obtained.

TABLE 1

| Rubber Composition for Powder | Com. ex. A | Example B | C | D | E | F | G | H | I | Com. Ex. J |
|---|---|---|---|---|---|---|---|---|---|---|
| Natural Rubber | 100 | 100 | 100 | 100 | 100 | 50 | 100 | 100 | 100 | 100 |
| Polybutadiene | — | — | — | — | — | 50 | — | — | — | — |
| Carbon black N220 | — | — | 20 | — | — | — | — | — | — | — |
| Clay | 20 | 40 | 40 | 60 | 60 | 60 | 60 | 60 | 90 | 110 |
| Silane coupling agent | 1 | 2 | 2 | — | 2 | 2 | 6 | 10 | 6 | 6 |
| Stearic acid | 2 | 2 | 2 | 2 | 2 | 2 | 2 | 2 | 2 | 2 |
| Chinese white | 4 | 4 | 4 | 4 | 4 | 4 | 4 | 4 | 4 | 4 |
| Antioxidant | 1 | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 | 1.5 |
| Vulcanization accelerator | 0.5 | 0.5 | 0.5 | 0.5 | 0.5 | 0.5 | 0.5 | 0.5 | 0.5 | 0.5 |

In Table 1, the vulcanized rubber powders A, J comprising the rubber composition for powder in which the blending amount of the clay is out of the scope of the present invention correspond to comparative examples, and vulcanized rubber powder B–I correspond to examples of the present invention.

Preparation of Tread Rubber Composition

Tread rubber compositions of the formulations shown in Table 3 according to Examples 1–11 and Comparative Examples 1–5 were prepared except for changing the kind and the blending amount of the vulcanized rubber powder and the blending amount of the process oil as shown in Table 2. A vulcanized rubber powder of complete 60 mesh pass was used except for Example 7. The vulcanized rubber powder used in Example 7 was the vulcanized rubber powder E prepared as above with a grain size of complete 14 mesh pass (indicated by E* in Table 3). As the process oil, DIANAPROCESS PS32 (trade name) manufactured by Idemitsu Kosan Co., Ltd. was used. As the antioxidant 6PPD, OZONONE 6C (trade name) manufactured by Seiko Kagaku Co., Ltd. was used. This is N-phenyl-N'-(1,3-dimethylbutyl)-p-phenylenediamine. As the vulcanization accelerator, NOXCELER NS (trade mane) manufactured by Ohuchi Shinko Kagaku was used. This is N-tert-butyl-2-benzothiazyl sulfene amide.

TABLE 2

| Ingredients | Weight parts |
| --- | --- |
| Natural rubber | 50 |
| Polybutadiene | 50 |
| Carbon black N220 | 45 |
| Process oil | varied |
| Vulcanized rubber powder | varied |
| Stearic acid | 2 |
| Chinese white | 4 |
| Antioxidant 6PPD | 1 |
| Sulfur | 1.5 |
| Vulcanization accelerator | 1 |

In Table 3, the proportion of clay to tread rubber composition is the amount of clay (parts by weight) essentially contained in each tread rubber composition and is calculated from the kind and content of vulcanized rubber powder. Taking Example 1, for instance, 50 parts by weight of vulcanized rubber powder B (40 parts by weight of clay is contained in the tread rubber composition (100+40+2+2+4+1+1.5+0.5=151 parts by weight) and, hence, the proportion of clay to the tread rubber composition is 50×(40/151)=13 parts by weight (by counting fractions of 0.5 and over as a unit and cutting away the rest). The proportion of clay to the total amount of rubber components (phr) is the content of clay relative to 100 parts by weight of the total amount of the rubber components in each tread rubber composition (the sum of the matrix rubber component and the rubber component of the vulcanized rubber powder). Taking Example 1, for instance, the total amount of the rubber components of the tread rubber composition is the sum of the content of the rubber component in the vulcanized rubber powder contained in the tread rubber composition and the content of the matrix rubber component, i.e., 50×(100/155)=33 parts by weight (counting fractions of 0.5 and over as a unit and cutting away the rest)+100 parts by weight=133 parts by weight. Hence, the proportion of clay to the total amount of the rubber components in the tread rubber composition is 13×(100/133)=10 parts by weight (counting fractions of 0.5 and over as a unit and cutting away the rest).

The gripping force and fracture resistance of each of the tread rubber compositions according to Examples and Comparative Examples were evaluated by the following methods, and the results were as shown in Table 3.

(1) Gripping Force

Studless tires for 165R13 (inner pressure: 2 kgf) manufactured by using each tread rubber composition were mounted on a home-manufactured FF-ABS automobile of 1500 cc and evaluated by a brake stopping distance on ice at an atmospheric temperature of −3° C. and ice temperature of −2.5° C. The brake stopping distance was measured as a distance required till stopping after wheels were locked during running at a speed of 30 km/h. The measured brake stopping distance is indicated as an index based on the value measured with Comparative Example 5 not blended with the vulcanized rubber powder being assumed as 100.

(2) Fracture Resistance

Vulcanized rubber test pieces were prepared of respective tread rubber compositions, and evaluated by the tearing strength of the test pieces. The tearing strength was measured according to JIS K6301 and indicated as an index based on the result of Comparative Example 5 not using vulcanized rubber powder being assumed as 100. As the index is larger, the evaluation is better.

TABLE 3

| | Example | | | | | | | | | | | Comparative Example | | | | |
| --- | --- | --- | --- | --- | --- | --- | --- | --- | --- | --- | --- | --- | --- | --- | --- | --- |
| | 1 | 2 | 3 | 4 | 5 | 6 | 7· | 8 | 9 | 10 | 11 | 1 | 2 | 3 | 4 | 5 |
| Vulcanized rubber powder | | | | | | | | | | | | | | | | |
| Type | B | C | D | E | E | E | E | F | G | H | I | A | E | E | J | — |
| Content | 50 | 50 | 50 | 50 | 30 | 80 | 50 | 50 | 50 | 50 | 50 | 50 | 20 | 100 | 50 | — |
| Process oil | 3 | 5 | 3 | 5 | 3 | 7 | 5 | 5 | 7 | 9 | 9 | — | 3 | 9 | 10 | — |
| Proportion of clay to tread rubber composition (wt. parts) | 13 | 12 | 18 | 18 | 11 | 28 | 18 | 18 | 17 | 17 | 22 | 8 | 7 | 35 | 24 | — |
| Proportion of clay to the total amount of rubber components (phr) | 10 | 9 | 14 | 14 | 9 | 19 | 14 | 14 | 14 | 13 | 18 | 6 | 6 | 22 | 20 | — |
| Evaluation | | | | | | | | | | | | | | | | |
| Fracture resistance | 98 | 101 | 104 | 100 | 105 | 99 | 95 | 103 | 98 | 96 | 97 | 106 | 104 | 90 | 93 | 100 |
| Breaking Performance | 109 | 104 | 103 | 118 | 109 | 111 | 108 | 110 | 106 | 105 | 110 | 98 | 96 | 93 | 95 | 100 |

Evaluation

As can be seen from Table 3, all the tread rubber compositions according to the examples of the present invention were excellent over the tread rubber compositions according to the comparative examples in terms of the braking performance.

In terms of the fracture resistance, on the other hand, the difference remained within ±5% even after blending the vulcanized rubber powder, which was not particularly poor as compared with the case of not blending the vulcanized rubber powder. However, the tread rubber composition of Example 7 in which the vulcanized rubber powder with a grain size over 20 mesh tended to show some degradation in the fracture resistance. From Examples 4–6 and Comparative Examples 2 and 3, it can be seen that the fracture resistance tend to be lowered as the blending amount of the same kind of vulcanized rubber powder is increased.

What is claimed is:

1. A rubber composition for a tire tread comprising 100 parts by weight of a diene rubber containing as a main component thereof at least one rubber selected from the group consisting of natural rubber, polyisoprene and polybutadiene, and 30 to 90 parts by weight of a vulcanized rubber powder, wherein the vulcanized rubber powder is a powder of a rubber resulting from vulcanization of a rubber composition including 100 parts by weight of a diene rubber containing as a main component thereof at least one rubber selected from the group consisting of natural rubber, polyisoprene and polybutadiene and 30 to 100 parts by weight of a clay mainly composed of kaolinite.

2. A rubber composition for a tire tread comprising 100 parts by weight of a diene rubber containing as a main component thereof at least one rubber selected from the group consisting of natural rubber, polyisoprene and polybutadiene, and 30 to 90 parts by weight of a vulcanized rubber powder, wherein the vulcanized rubber powder is a powder of a rubber resulting from vulcanization of a rubber composition including 100 parts by weight of a diene rubber containing as a main component thereof at least one rubber selected from the group consisting of natural rubber, polyisoprene and polybutadiene and 40 to 70 parts by weight of a clay mainly composed of kaolinite.

3. A rubber composition for a tire tread comprising 100 parts by weight of a diene rubber containing as a main component thereof at least one rubber selected from the group consisting of natural rubber, polyisoprene and polybutadiene, and 30 to 90 parts by weight of a vulcanized rubber powder, wherein the vulcanized rubber powder is a powder of a rubber resulting from vulcanization of a rubber composition including 100 parts by weight of a diene rubber containing as a main component thereof at least one rubber selected from the group consisting of natural rubber, polyisoprene and polybutadiene, 30 to 100 parts by weight of a clay mainly composed of kaolinite, and a silane coupling agent represented by the formula $X_3SiR$ in which X represents an alkoxy group or chlorine atom and R represents a glycidoxy, methacryl, amino, mercapto, expoxy, or imide group, or $(CnH_{2n+1}O)_3$—Si—$(CH_2)_m$—$S_k$—$(CH_2)_m$—Si—$(CnH_{2n+1}O)_3$ in which n is an integer of from 1 to 4, and m and k are each an integer of from 1 to 6.

4. A rubber composition for tire tread comprising 100 parts by weight of a diene rubber containing as a main component thereof at least one rubber selected from the group consisting of natural rubber, polyisoprene and polybutadiene, and 30 to 90 parts by weight of a vulcanized rubber powder, wherein the vulcanized rubber powder is a powder of a rubber resulting from vulcanization of a rubber composition including 100 parts by weight of a diene rubber containing as a main component thereof at least one rubber selected from the group consisting of natural rubber, polyisoprene and polybutadiene, 30 to 100 parts by weight of a clay mainly composed of kaolinite, and a silane coupling agent comprising vinylethoxysilane.

5. The rubber composition for a tire tread as set forth in any one of claims 1 to 4, wherein said clay is an amorphous metakaolin calcined at about 600° C.

6. The rubber composition for a tire tread as set forth in claim 3 or 4, wherein said silane coupling agent is blended in an amount of 1 to 8 parts by weight relative to 100 parts by weight of the rubber component of the vulcanized rubber powder.

7. The rubber composition for a tire tread as set forth in claim 3 or 4, wherein said silane coupling agent is blended in an amount of 2 to 5 parts by weight relative to 100 parts by weight of the rubber component of the vulcanized rubber powder.

8. A rubber composition for a tire tread comprising 100 parts by weight of a diene rubber containing as a main component thereof at least one rubber selected from the group consisting of natural rubber, polyisoprene and polybutadiene, and 30 to 90 parts by weight of a vulcanized rubber powder, wherein the vulcanized rubber powder is a powder of a rubber resulting from vulcanization of a rubber composition including 100 parts by weight of a diene rubber containing as a main component thereof at least one rubber selected from the group consisting of natural rubber, polyisoprene and polybutadiene, and 30 to 100 parts by weight of a clay mainly composed of kaolinite, and wherein the vulcanized rubber powder has a grain size of complete 20 mesh pass.

9. A rubber composition for a tire tread comprising 100 parts by weight of a diene rubber containing as a main component thereof at least one rubber selected from the group consisting of natural rubber, polyisoprene and polybutadiene, and 30 to 90 parts by weight of a vulcanized rubber powder, wherein the vulcanized rubber powder is a powder of a rubber resulting from vulcanization of a rubber composition including 100 parts by weight of a diene rubber containing as a main component thereof at least one rubber selected from the group consisting of natural rubber, polyisoprene and polybutadiene, and 30 to 100 parts by weight of a clay mainly composed of kaolinite, and wherein the vulcanized rubber powder has a grain size of complete 60 mesh pass.

10. The rubber composition for a tire tread as set forth in claim 8 or 9, further comprising a silane coupling agent represented by the formula $X_3SiR$ in which X represents an alkoxy group or chlorine atom and R represents a glycidoxy, methacryl, amino, mercapto, epoxy, imide group, or by $(CnH_{2n+1}O)_3$—Si—$(CH_2)_m$—$S_k$—$(CH_2)_m$—Si—$(CnH_{2n+1}O)_3$ in which n is an integer of from 1 to 4, and m and k are each an integer of from 1 to 6.

11. A rubber composition for a tire tread comprising 100 parts by weight of a diene rubber containing as a main component thereof at least one rubber selected from the group consisting of natural rubber, polyisoprene and polybutadiene, and 40 to 70 parts by weight of a vulcanized rubber powder, wherein the vulcanized rubber powder is a powder of a rubber resulting from vulcanization of a rubber composition including 100 parts by weight of a diene rubber containing as a main component thereof at least one rubber selected from the group consisting of natural rubber, polyisoprene and polybutadiene, and 30 to 100 parts by weight of a clay mainly composed of kaolinite.

12. The rubber composition for a tire tread as set forth in claim 11, wherein said vulcanized rubber powder has a grain size of complete 20 mesh pass.

13. A rubber composition for a tire tread comprising 100 parts by weight of a diene rubber containing as a main component thereof at least one rubber selected from the group consisting of natural rubber, polyisoprene and polybutadiene, and 30 to 90 parts by weight of a vulcanized rubber powder, wherein the vulcanized rubber powder is a powder of a rubber resulting from vulcanization of a rubber composition including 100 parts by weight of a diene rubber containing as a main component thereof at least one rubber selected from the group consisting of natural rubber, polyisoprene and polybutadiene, and 30 to 100 parts by weight of a clay mainly composed of kaolinite, and wherein said clay is contained in an amount of 10 to 40 parts by weight relative to 100 parts by weight of the total amount of the rubber components of the rubber composition for tire tread.

14. The rubber composition for a tire tread as set forth in any one of claims 11 to 13, further comprising a silane coupling agent represented by the formula $X_3SiR$ in which X represents an alkoxy group or chlorine atom and R represents a glycidoxy, methacryl, amino, mercapto, epoxy, imide group, or $(CnH_{2n+1}O)_3$—Si—$(CH_2)_m$—$S_k$—$(CH_2)_m$—Si—$(CnH_{2n+1}O)_3$ in which n is an integer of from 1 to 4, and m and k are each an integer of from 1 to 6.

15. The rubber composition for a tire tread as set forth in any one of claims 11 to 13, further comprising a silane coupling agent formed of vinylethoxysilane.

16. The rubber composition for a tire tread as set forth in any one of claims 11 to 13, further comprising 1 to 8 parts by weight of a silane coupling agent represented by the formula $X_3SiR$ in which X represents an alkoxy group or chlorine atom and R represents a glycidoxy, methacryl, amino, mercapto, epoxy, imide group, or $(CnH_{2n+1}O)_3$—Si—$(CH_2)_m$—$S_k$—$(CH_2)_m$—Si—$(CnH_{2n+1}O)_3$ in which n is an integer of from 1 to 4, and m and k are each an integer of from 1 to 6.

17. The rubber composition for a tire tread as set forth in any one of claims 11 to 13, further comprising 1 to 8 parts by weight of an silane coupling agent formed of vinylethoxysilane.

18. The tire tread comprising a rubber composition for the tire tread as recited in any one of claims 1 to 4, 8, 9 and 11 to 13.

19. The tire comprising a tire tread formed of a rubber composition for the tire tread as recited in any one of claims 1 to 4, 8, 9 and 11 to 13.

* * * * *